Dec. 8, 1931.  A. M. ROSSMAN  1,835,338
UNIT PIPE CLAMP FITTINGS
Filed Oct. 25, 1926   3 Sheets-Sheet 1
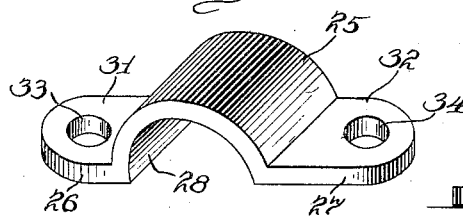
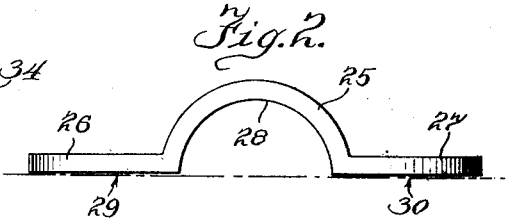
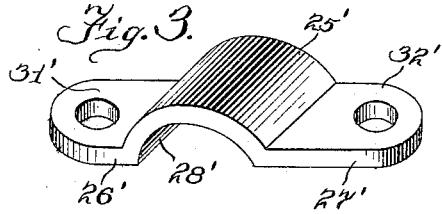
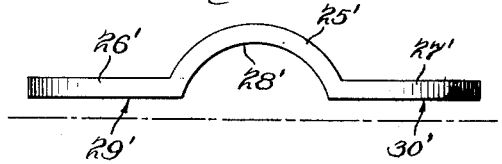
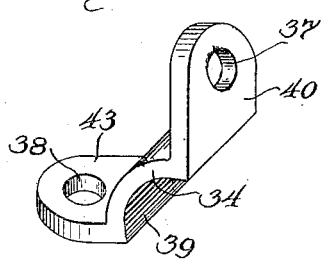
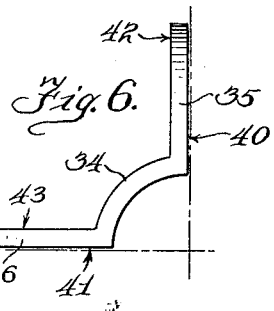
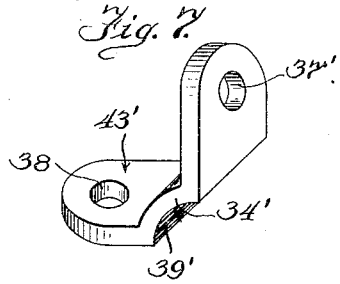
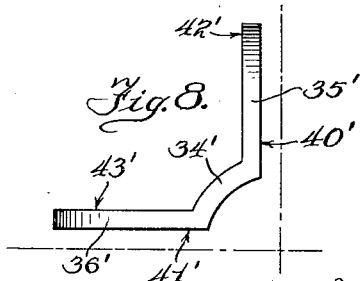
Inventor
Allen M. Rossman.
By Williams, Bradbury,
McCabe & Hinkle
Attorneys.

Dec. 8, 1931.　　　A. M. ROSSMAN　　　1,835,338
UNIT PIPE CLAMP FITTINGS
Filed Oct. 25, 1926　　3 Sheets-Sheet 2
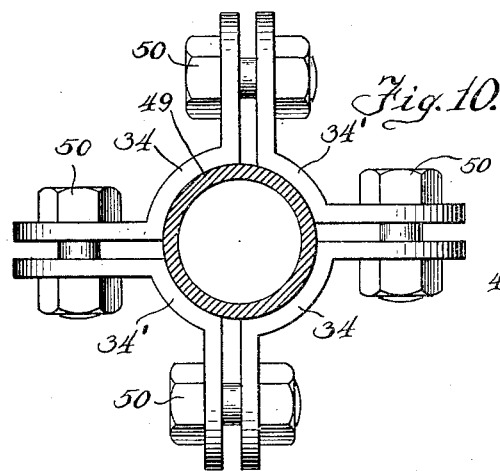
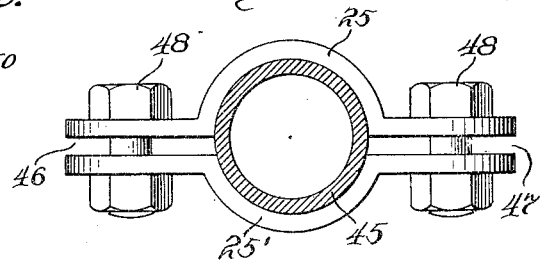
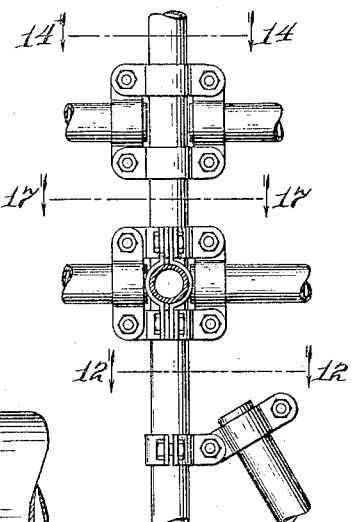
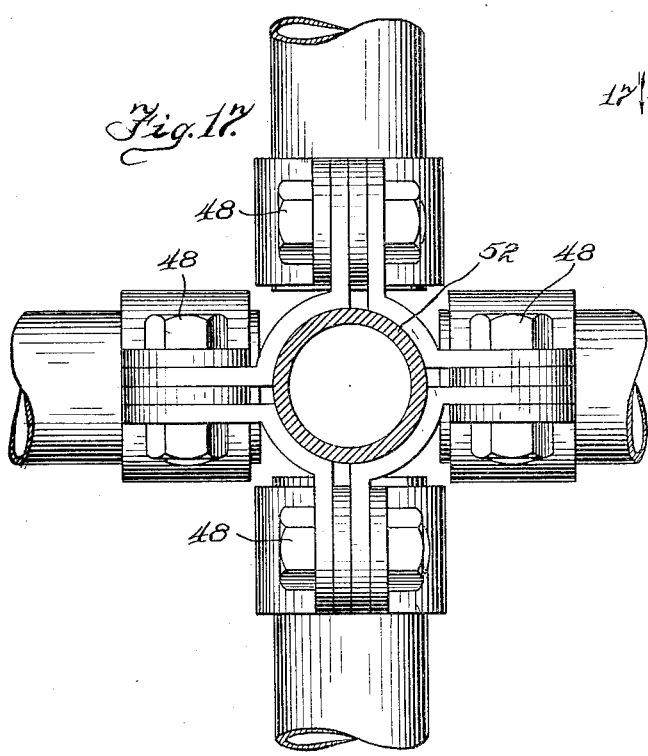
Inventor
Allen M. Rossman
By Williams, Bradbury,
McCall & Hinkle
Attorneys Dec. 8, 1931.　　　A. M. ROSSMAN　　　1,835,338
UNIT PIPE CLAMP FITTINGS
Filed Oct. 25, 1926　　3 Sheets-Sheet 3

Inventor
Allen M. Rossman
By Williams, Bradbury,
McCaleb & Hinkle
Attorneys.

Patented Dec. 8, 1931

1,835,338

UNITED STATES PATENT OFFICE

ALLEN M. ROSSMAN, OF CHICAGO, ILLINOIS, ASSIGNOR, BY MESNE ASSIGNMENTS, TO ROSSMAN PATENTS, INCORPORATED, OF CHICAGO, ILLINOIS, A CORPORATION OF ILLINOIS

UNIT PIPE CLAMP FITTINGS

Application filed October 25, 1926. Serial No. 143,875.

My invention relates to clamps.

It will be explained as embodied in a clamp particularly adapted to hold cylindrical rods or pipes together in various arrangements and combinations.

In the erection of many kinds of structures, such, for example, as switchboards, panel boards, scaffolds and open metal towers and frameworks for supporting walls, machinery and appliances, it is common practice to use cylindrical metal rods or pipes which are clamped together in such a manner as to produce the desired structure and to afford the requisite strength and rigidity thereof. It is often necessary or desirable to join together a considerable number of such pipes or rods at various angles.

It is now the usual practice for manufacturers of clamps used in the fabrication of such structures to provide a large number of different types of clamps, each type being especially adapted for some particular condition, as to the number of pipes it can accommodate and as to the angle at which the pipes are joined. This practice results in inconvenience and excessive expense, both to the manufacturer and to the user. The manufacturer must produce and stock and the user must keep on hand a large variety of clamps in order that the particular device required for any situation which may arise will be available. The necessary number and variety of clamps causes confusion, loss of time and expense.

When my new and improved clamp is used it is only necessary to have a supply of four kinds of simple and inexpensive units and sufficient nuts and bolts to secure said units. These four kinds of units may be so assembled as to join a plurality of pipes having various angular relationships and lying in several different planes.

One object of this invention is to provide an improved clamp.

Another object is to provide a clamp which will overcome the objections to the present clamps heretofore manufactured.

Another object is to provide an improved clamp unit.

Another object is to provide clamp units which may readily be assembled in proper relation.

Another object is to provide four styles of clamp units which may be associated in a variety of ways to fabricate clamps for a wide range of use.

Another object is to provide complementary clamp units whose relation in various assemblies may readily be determined.

Another object is to provide clamp units which may be secured together in various combinations with a minimum number of bolts.

Another object is to provide clamp units which are simple, inexpensive, reliable and strong.

Other objects and advantages will hereinafter appear.

In general, the clamp units, from which the various clamps may be fabricated, comprise half clamp units and quarter clamp units. The half units are so named because two such units will, when properly assembled, form a substantially complete circular clamp section or collar. The quarter units are so named because four such units will form substantially a complete circular clamp section or collar. Of course, one half unit and two quarter units will also form a substantially complete circular clamp section or collar. Both the half clamp units and the quarter clamp units are made in two forms, the two forms co-operating as complementary members to produce the desired clamp.

The adaptability of my invention is such that a single composite clamp can be assembled from these units which will take care of all pipes whose axes intersect at a point common to all of said axes. This adaptability results from the gap formed between adjacent lugs of complementary members of a pair of units, which gap permits the introduction therebetween of a lug of a co-operating pair of complementary units with the resulting alternative arrangement of the lugs of the co-operating pairs as hereinafter clearly shown.

Embodiments and illustrative applications of the invention are shown in the accompanying drawings, wherein Figure 1 is a perspective of one type of half-clamp unit;

Figure 2 is a side elevation thereof;

Figure 3 is a perspective of the other type of half-clamp unit;

Figure 4 is a side elevation of Figure 3;

Figure 5 is a perspective of one type of quarter-clamp unit;

Figure 6 is a side elevation thereof;

Figure 7 is a perspective of the other type of quarter-clamp unit;

Figure 8 is a side elevation of Figure 7;

Figure 9 shows two complementary half-clamp units assembled to form a clamp section or encircling collar;

Figure 10 shows two of each form of quarter-clamp unit assembled to form a clamp section or encircling collar;

Figure 11 is an elevation of a part of a typical framework, showing three different types of connections or joints between pipes;

Figure 17 is a section on the line 17—17 of Figure 11.

Figure 12:
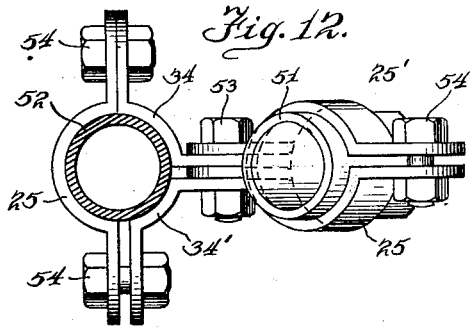
Figure 12 is an enlarged section on the line 12—12 of Figure 11, showing an arrangement of units to form a single joint or two-way connection illustrated at the bottom thereof.

The half unit shown in Figures 1 and 2 comprises a curved body 25 and two outwardly projecting clamping lugs 26 and 27, one lug being at each end of the body 25. The body 25 has an inner or pipe clamping face 28 which is curved on the arc of a circle having a diameter approximately the same as the external diameter of the pipe or rod with which it is to be used. Preferably, the thickness of the body 25 and lugs 26 and 27 are about the same and sufficient to withstand the loads to which the units will be subjected. The lugs 26 and 27 have inner or front clamping faces 29 and 30, respectively, located approximately in a plane of a diameter of the body or pipe clamping face 28, and rear or outer clamping faces 31 and 32, respectively, substantially parallel thereto. The clamping faces 29 and 30 preferably should fall slightly short of being in a plane of a diameter of curved face 28 so that the pipe or rod will be tightly clamped when the units are assembled. About one thirty-second of an inch has been found to give good results under ordinary conditions. The clamping lugs 26 and 27 are provided with holes 33 and 34, respectively, for the receipt of assembly bolts, as will hereinafter be explained.

The half unit shown in Figures 3 and 4 is generally similar in configuration to that shown in Figures 1 and 2 and comprises a curved body 25' having outwardly projecting clamping lugs 26' and 27' at each end thereof. The body 25' has an inner or pipe clamping face 28' which is curved on the arc of a circle having a diameter approximately the same as the external diameter of the pipe or rod with which it is to be used. In this form of half unit the lugs 26' and 27' have inner or front clamping faces 29' and 30', respectively, located in a plane which is spaced from and parallel to a plane of a diameter of the body or pipe clamping face 28'. The width of this space is substantially the thickness of the lugs. The lugs 26' and 27' are provided with outer clamping faces 31' and 32' substantially parallel to their respective front clamping faces.

The quarter unit shown in Figures 5 and 6 comprises a curved body 34 and two right angularly related, outwardly projecting clamping lugs 35 and 36. There is one clamping lug at each end of the curved body and they are provided with suitable bolt holes 37 and 38, respectively. The inner or pipe clamping face 39 of the body 34 is curved on the arc of a circle whose diameter is approximately the same as the external diameter of the pipe or rod with which the unit is to be used, and extends a full quarter of the circle. The inner or pipe clamping faces 40 and 41 of the lugs 35 and 36, respectively, are approximately in planes of radii of the curve of the pipe clamping face 39, preferably falling slightly short of the radii in order to insure a tight grip upon a pipe. As in the case of the half unit, about one thirty-second of an inch ordinarily will produce satisfactory results. The lugs 35 and 36 have rear clamping faces 42 and 43, respectively.

The quarter unit shown in Figures 7 and 8 has a similar configuration to that shown in Figures 5 and 6, comprising a curved body 34' and right angularly related, outwardly projecting clamping lugs 35' and 36' provided with bolt holes 37' and 38', respectively. The inner or pipe clamping face 39' of the body 34' is curved on the arc of a circle whose diameter is approximately the same as the external diameter of the pipe or rod with which the unit is to be used, but it extends somewhat less than a quarter of the circle. The inner or front clamping faces 40' and 41' of the lugs 35' and 36', respectively, are located in planes spaced from and parallel to planes of radii of the curve of the pipe clamping face 39'. The width of this space is substantially the thickness of a lug. The lugs 35' and 36' have outer clamping faces 42' and 43' respectively.

These four kinds of clamp units are adapted to be assembled in co-operating relation to form clamps for joining together two or more pipes or similar rod-like members. If found desirable to facilitate such assembly, the short units, i. e., the quarter units and half units whose curved bodies fall short of a complete quarter section or half section, respectively, may be provided with distinctive marking so as to be readily distinguished from the full quarter units and half units. The full units and short units are so arranged in assembling the clamp as to provide gaps or spaces between the adjacent lugs of the co-operating units encircling one pipe, into which space is placed a lug of one of the units encircling an adjacent pipe.

Figure 9 shows how two half units 25 and 25' can be assembled to form a clamp section to encircle completely a cylindrical pipe or rod 45. Spaces or gaps 46 and 47 are provided between the adjacent lugs of the complementary units. Bolts 48, which pass through aligned holes in the lugs of the complementary units, serve to anchor the units together and cause the clamp to bind upon and grip the pipe or rod.

Figure 10 similarly shows how two quarter units 34 and two quarter units 34' may be assembled to form a completely encircling clamp section about a pipe or rod 49. The units are assembled in alternating relationship, thereby providing gaps between the adjacent lugs of adjacent units. Bolts 50, which pass through the holes in the unit lugs, hold the units together and cause them to bind upon and grip the pipe or rod.

These four clamp units provide for the easy fabrication of a large variety of clamps, a few typical examples of which will hereinafter be described.

A supply of these four clamp units and the necessary nuts and bolts constitute a simple and inexpensive outfit with which it is possible to clamp together rapidly and securely pipes or rods lying in several different planes and having various angular relationships. This adaptability of my invention is such that a composite clamp can be assembled which will take care of and securely join all pipes or similar members whose axes intersect at a point common to all of them.

Figure 13:
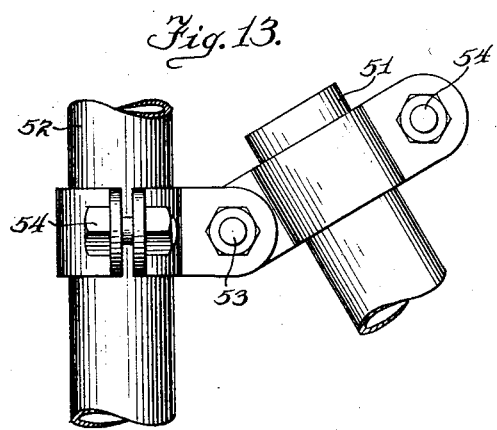
Figure 13 is a side elevation of the connection or joint shown in Figure 12.

Figures 12 and 13 illustrate in detail an assembly and arrangement of units for fabricating a two-way clamp suitable for joining two pipes together at an angle, as shown at the bottom of Figure 11. In the drawings a bracing pipe 51 is joined to a standard or upright pipe 52 in the same plane. To form one section of the complete clamp, a full half unit 25 and a short half unit 25' have been used and to form the other section one full half unit, one full quarter unit, and one short quarter unit have been used. Of course, the latter section could have been formed of four quarter units or of two half units if desired.

The two sections of the clamp are joined by a bolt 53 which passes through the aligned holes in the overlapping lugs of the units. At the joint the lugs of the units of one clamp section alternate with the lugs of the units of the other clamp section. The other sets of adjacent lugs are clamped together by bolts 54. It will thus be seen that the space or gap provided between the adjacent lugs of adjacent clamp units of one section permits the introduction therebetween of a lug of one of the units forming part of the other clamp section.

Figure 14:
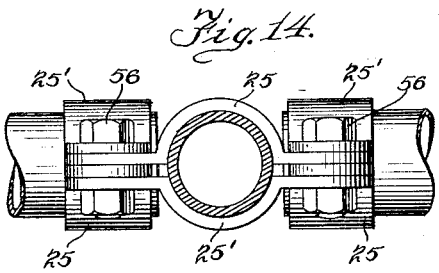
Figure 14 is an enlarged section on the line 14—14 of Figure 11, showing an arrangement of units to form the four-way connection or joint illustrated at the top thereof.
Figure 15:
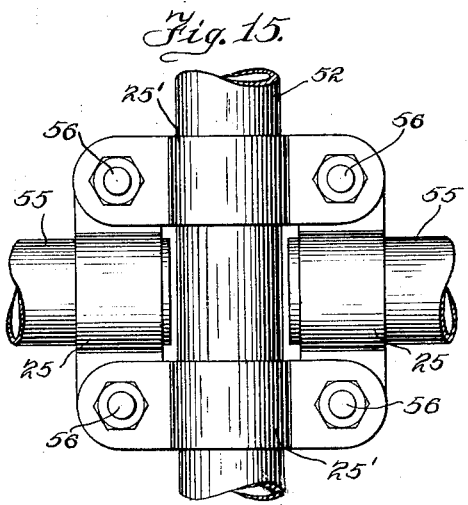
Figure 15 is a side elevation of the connection shown in Figure 14.

Figures 14 and 15 illustrate an arrangement and assembly of units to form a four-way clamp suitable for joining two pipe sections 55 to the up-right 52, as shown at the top of Figure 11. This clamp is shown as fabricated entirely from full and short half units 25 and 25', respectively. The adjacent or angularly related sections of the clamp are held together by bolts 56 which pass through the aligned holes of their overlapped lugs. At the corner or joint between sections, the lugs on the units of adjacent sections alternate or overlap each other, as most clearly shown in Figure 14.

Although Figures 14 and 15 illustrate two pipes united at right angles to a pipe which passes entirely through the clamp, it will be understood that the same clamp might be used to unite four pipes, each of which ends at the clamp.

Figure 16:
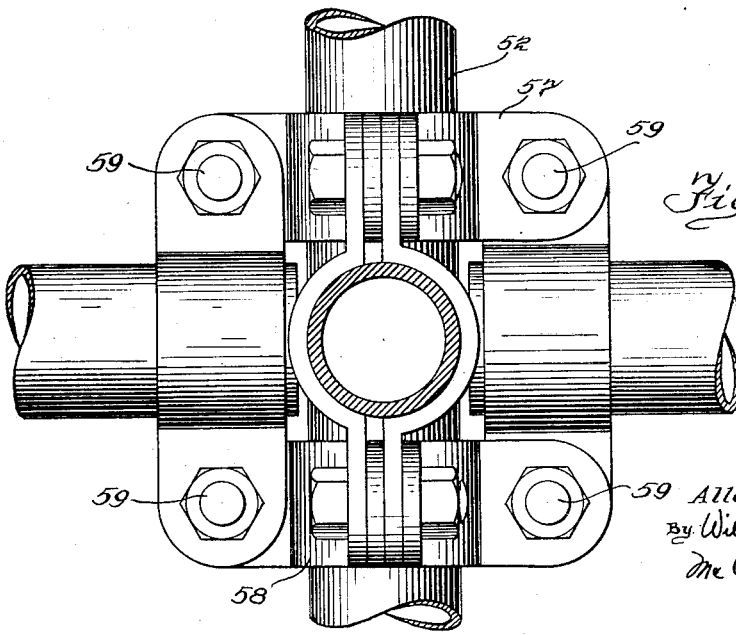
Figure 16 is an enlarged side elevation of the six-way connection or joint shown at the middle of Figure 11.

Figures 16 and 17 show an arrangement and assembly of units to form a six-way clamp, suitable for uniting four pipes to the up-right 52, as shown at the center of Figure 11, or for joining six pipes if all end at the clamp. In fabricating a clamp of this type quarter units are used to form two of the opposite sections, for example, upper section 57 and lower section 58, in order to accommodate the lugs forming the four sections which lie at right angles thereto. The other units, however, may be half units. At each corner of the clamp the lugs of the angularly related section units overlap in alternate relationship as previously described, the same being secured together by bolts 59.

Having thus illustrated and described an embodiment of my invention, what I claim and desire to secure by United States Letters Patent is as follows.

I claim:

1. A clamp for joining pipes and the like, comprising two kinds of units, one kind of unit consisting of a curved body having a clamping face curved on the arc of a circle, and a lug projecting outwardly from each end of the body, each lug having an inner clamping face in a plane parallel to a radius of the body clamping face and spaced therefrom approximately the thickness of a lug; the other kind of unit comprising a curved body having a clamping face curved on the arc of a circle, and a lug projecting outwardly from each end of the body, each lug having an inner clamping face approximately in the plane of a radius of the curve of the body clamping face.

2. A clamp for joining rod-like members so that they lie in the same plane or lie in planes intersecting in a common line, comprising a clamp section for embracing and gripping each rod-like member, each clamp section comprising complementary units to form an encircling collar, each unit comprising a body and projecting lugs extending from each end of the body, the body of one unit being longer by twice the thickness of a lug than the body of a complementary unit, and a pivot secured through projecting lugs of different units to connect cooperating clamp sections, the lugs of the units of the cooperating clamp sections being interleaved.

3. A clamp for joining pipes and the like so that they lie in a single plane or in planes which intersect in a common line, comprising angularly related clamp sections, one for encircling each pipe, each clamp section comprising a complementary pair of units, one of said units consisting of a curved body having a clamping face curved on the arc of a circle, and a lug projecting outwardly from each end of the body, each lug having an inner clamping face in a plane parallel to the radius of the body clamping face, and spaced therefrom approximately the thickness of a lug, the other kind of unit comprising a curved body having a clamping face curved on the arc of a circle, and a lug projecting outwardly from each end of the body, each lug having an inner clamping face approximately in the plane of the radius of the curve of the body clamping face, and means for connecting said clamp sections, the lugs of one clamp section being interleaved with the lugs of a connected clamp section.

In witness whereof, I hereunto subscribe my name this 21 day of October, 1926.

ALLEN M. ROSSMAN.